(12) United States Patent
Yamazaki et al.

(10) Patent No.: US 6,232,554 B1
(45) Date of Patent: May 15, 2001

(54) CABLE ENTRANCE MODULE (75) Inventors: Naoya Yamazaki; Motoko Nakamura, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/298,308

(22) Filed: Apr. 23, 1999

(30) Foreign Application Priority Data

Jun. 10, 1998 (JP) .................................................. 10-162497

(51) Int. Cl.$^7$ ...................................................... H02G 3/18
(52) U.S. Cl. ...................................... 174/65 SS; 174/65 R
(58) Field of Search .............................. 174/65 SS, 65 R (56) References Cited

U.S. PATENT DOCUMENTS

| | | | |
|---|---|---|---|
| 3,761,601 | * | 9/1973 | Kaesser et al. ..................... 174/65 R |
| 4,329,540 | * | 5/1982 | Howarth ............................ 174/65 SS |
| 4,549,037 | * | 10/1985 | Bawa et al. ....................... 174/65 SS |
| 5,399,807 | * | 3/1995 | Yarbrough et al. ................ 174/65 R |

FOREIGN PATENT DOCUMENTS

| | | |
|---|---|---|
| 57-74911 | 5/1982 | (JP) . |
| 57-204006 | 12/1982 | (JP) . |
| 4-191705 | 7/1992 | (JP) . |
| 6-27331 | 2/1994 | (JP) . |

* cited by examiner

*Primary Examiner*—Dean A. Reichard
*Assistant Examiner*—Angel R. Estrada
(74) *Attorney, Agent, or Firm*—Helfgott & Karas, P.C.

(57) ABSTRACT

A cable entrance module is provided at a position of equipment at which a cable enters the equipment from the outside. The cable is inserted through the inside of the cable entrance module. The cable entrance module includes an entrance-side membrane, an exit-side membrane, and a viscous-matter-filling portion. The inside of the filling portion is filled with viscous matter. The entrance-side membrane has such strength that when it is pierced by the extending end of the cable it is pushed by the extending end of the cable. The exit-side membrane has a strength such that it is not pierced by the viscous matter when the cable pierces the entrance-side membrane, enters the viscous-matter filling portion, and moves through the viscous matter in the viscous-matter filling portion while pushing the viscous matter aside. The exit-side membrane is pierced by the extending end of the cable when it is pushed by the extending end of the cable.

15 Claims, 11 Drawing Sheets

FIG. 3A PRIOR ART
FIG. 3B PRIOR ART
AFTER BEING PRESSED

FIG. 3C PRIOR ART
FIG. 3D PRIOR ART
AFTER BEING PRESSED

CABLE ENTRANCE MODULE

BACKGROUND OF THE INVENTION

1. Field of the Invention

The present invention relates to a cable entrance module, and, in particular, to a cable entrance module which is applied to an optical subscriber-line network unit installed aerially.

Figure 1:
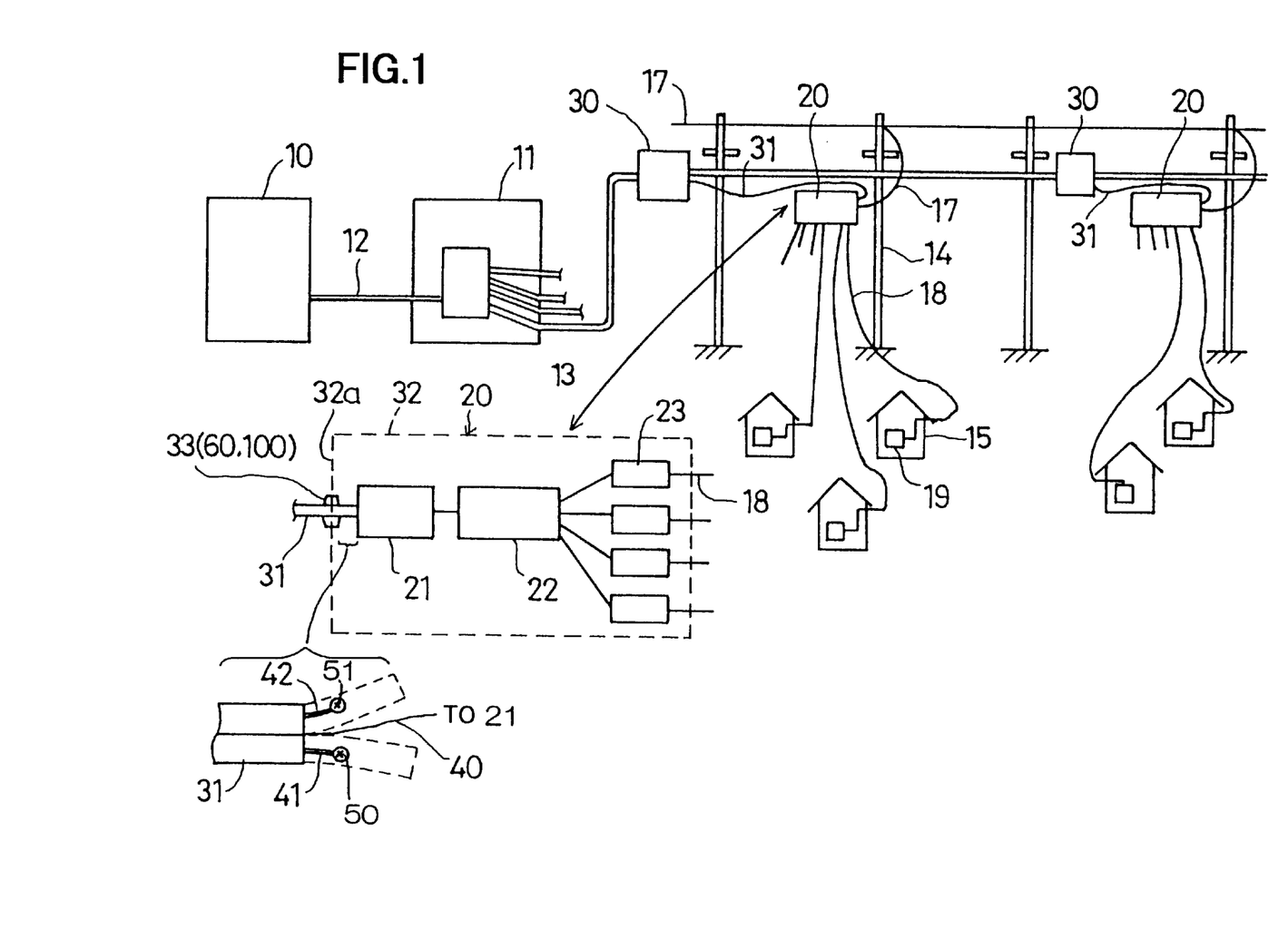
FIG. 1 roughly shows a communication system to which an optical subscriber-line network unit is applied.

FIG.1 roughly shows a communication system to which an optical subscriber-line network unit is applied. This communication system is proposed as a near future system for coping with multimedia use. A feature of this system is that an optical cable extends to a position near to houses.

Telephone stations 10 and 11 are connected by an optical cable 12. From the telephone station 11, a multi-conductor trunk-line optical cable 13 extends via branch units 30 while being installed on poles 14. An aerially installed optical subscriber-line network unit 20 is set aerially outdoors for every ten houses, for example. In the branch unit 30, a one-conductor drop cable 31 branches off from the trunk-line optical cable 13, and the drop cable 31 enters the optical subscriber-line network unit 20. The optical subscriber-line network unit 20 has an arrangement in which, in a box 32, a light-electricity converter 21, a multiplexer/demultiplexer 22, and ten and several subscriber channel units 23 are contained. The extending end of the drop cable 31 is connected to the optical subscriber-line network unit 20, and, also, a power line 17 is connected to the optical subscriber-line network unit 20. Power is supplied to the optical subscriber-line network unit 20 through the power line 17 so that the optical subscriber-line network unit 20 may operate. One outside-line metal cable 18 extends from each of the subscriber channel units 23, and, thus, ten and several outside-line metal cables 18 extend from the optical subscriber-line network unit 20. Each outside-line metal cable 18 extends to a respective one of houses 15, and is connected to a communication terminal such as a telephone, a facsimile machine or the like.

In this communication system, because the drop cable 31 extends to the position near to the houses 15 and the length of each of the outside-line metal cables 18 is short, it is possible to transmit a large amount of information in comparison to the conventional case. Further, in addition to voice transmission, image transmission is possible. Furthermore, a digital signal and so forth are transmitted.

In the above-described optical subscriber-line network unit 20, a drop-cable entrance module 33 is attached to a side plate 32a of the box 32. The drop cable 31 is inserted through the inside of the drop-cable entrance module 33, and, then, enters the box 32.

Figure 2A:
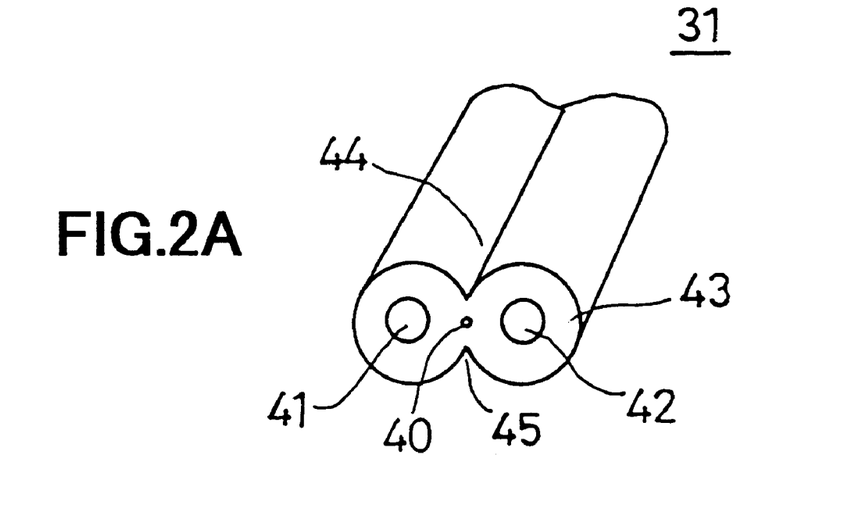
FIGS. 2A, 2B and 2C show drop cables.

As shown in FIG. 2A, the drop cable 31 includes an optical fiber 40 at the center thereof, and piano wires 41 and 42 on both sides thereof. The entirety of the drop cable is covered by a covering portion 43 made of vinyl chloride. Further, notch grooves 44 and 45 are formed in the drop cable 31 on the top and bottom sides facing the optical fiber 40. The drop cable 31 has an approximately figure-eight-shaped cross section, as shown in the figure. The drop cable 31 enters the box 32 through the drop-cable entrance module 33, and, then, as shown in FIG. 1, is split into two by using the notch grooves 44 and 45. Then, the optical fiber 40 is exposed, and a terminal treatment, in which the covering portion 43 is cut and removed, and the piano wires 41 and 42 are exposed, is performed. Then, the ends of the piano wires 41 and 42 are fixed to the box 32 by using fixing screws 50 and 51. The optical fiber 40 is connected to the light-electricity converter 21 by using an optical connector.

The piano wires 41 and 42 are provided for the purpose of receiving a pulling force when the drop cable 31 is pulled and preventing the pulling force from being applied to the optical fiber 40. The notch grooves 44 and 45 are formed for the purpose of enabling easy splitting of the drop cable 31 into two as mentioned above. The reason why the notch grooves 44 and 45 are formed on the top and bottom sides facing the optical fiber 40 is that the optical fiber 40 is exposed when the drop cable 31 is split into two at the end thereof as mentioned above.

Because the optical subscriber-line network unit 20 is set outdoors, it is demanded, in order for the optical subscriber-line network unit 20 to have a high reliability, that the drop-cable entrance module 33 is sufficiently waterproof so that rain water drops flowing on the drop cable 31 do not enter the optical subscriber-line network unit 20 in a condition in which the drop cable 31 has been inserted through the drop-cable entrance module 33.

The waterproof structure of the drop-cable entrance module 33 should be such that the cross section of the drop cable 31 is not a circle and has a special shape as mentioned above.

2. Description of the Related Art

Figure 3A:
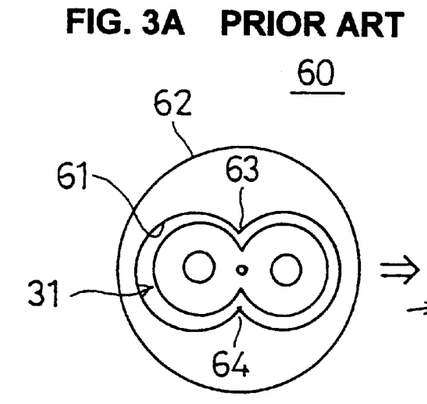
FIGS. 3A, 3B, 3C and 3D show the related art.

FIG. 3A shows a drop-cable entrance module 60 in the related art. The drop-cable entrance module 60 includes a sleeve 62 made of rubber having a tunnel 61, and a pressing mechanism (not shown in the figure) which presses the outer circumferential surface of the sleeve 62 as a result of screws being tightened. The cross section of the tunnel 61 has a figure-eight shape corresponding to the cross section of the drop cable 31. Projections 63 and 64 project inwards from the top and bottom of the tunnel 61, respectively. The projections 63 and 64 extend along the tunnel 61. The drop-cable entrance module 60 is attached to the side plate 32a of the box 32 of the optical subscriber-line network unit 20.

Figure 3B:
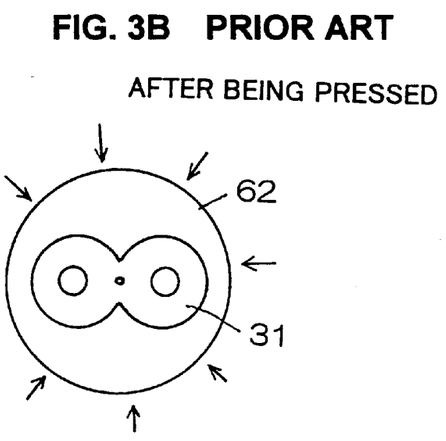

The drop cable 31 is inserted through the tunnel 61 of the sleeve 62 as shown in FIG. 3A. Then, the sleeve 62 is pressed by the pressing mechanism. As a result, as shown in FIG. 3B, the inner wall of the tunnel 61 makes contiguous contact with the outer circumferential surface of the drop cable 31, so that no gap is formed between the inner wall of the tunnel 61 and the outer circumferential surface of the drop cable 31. Thus, a waterproof structure is formed. Thereby, rain water drops flowing on the drop cable 31 are prevented from entering the optical subscriber-line network unit 20.

Figure 3C:
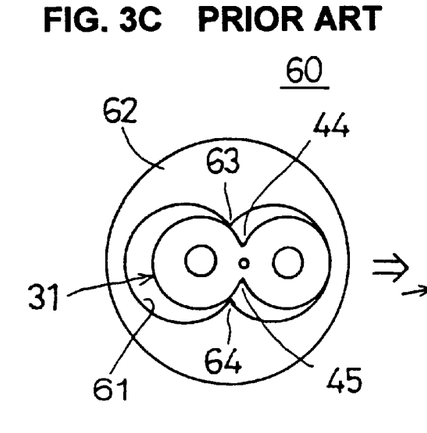
Figure 3D:
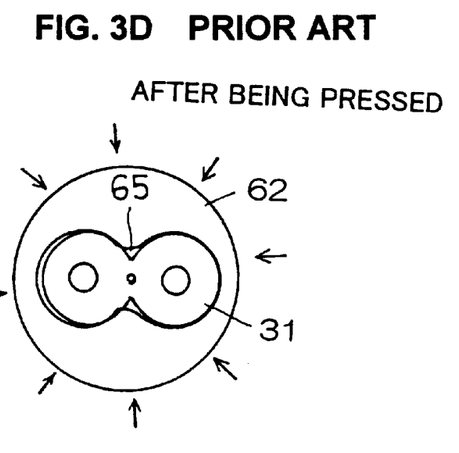

However, there may be a case where, as shown in FIG. 3C, the drop cable 31 is located at a position shifted rightward a little from the center of the tunnel 61. When the pressing mechanism presses the sleeve 62 in this condition, as shown in FIG. 3D, spaces 65 may remain between the outer surface of the drop cable 31 and the inner wall of the tunnel 61. The reason why the spaces 65 remain is that the cross section of the drop cable 31 has the special shape having the notch grooves 44 and 45, and the notch grooves 44 and 45 are not aligned with the projections 63 and 64, respectively. In a case where the drop cable 31 is located in a position shifted leftward a little from the center of the tunnel 61, similar spaces may remain. When spaces remain, a completely waterproof structure cannot be provided.

Thus, the drop-cable entrance module 60 in the related art is problematic in view of reliability.

SUMMARY OF THE INVENTION

An object of the present invention is to provide a cable entrance module in which the above-described problem is solved.

A cable entrance module according to the present invention is provided at a position of equipment at which position a cable enters the equipment from the outside. The cable is inserted through the inside of the cable entrance module. The cable entrance module comprises an entrance-side membrane, an exit-side membrane, and a viscous-matter filling portion, the inside of which portion is filled with viscous matter. The entrance-side membrane has a strength such that the entrance-side membrane is pierced by the extending end of the cable when being pushed by the extending end of the cable, the exit-side membrane has a strength such that the exit-side membrane is not pierced by the viscous matter during a step in which the cable pierces the entrance-side membrane, enters the viscous-matter filling portion, and moves through the viscous matter in the viscous-matter filling portion while pushing the viscous matter aside, and the exit-side membrane is pierced by the extending end of the cable when being pushed by the extending end of the cable.

In this arrangement, the gap between the cable and the pierced entrance-side membrane is narrow. As a result, the resistance against the viscous matter being pushed out through said gap when the extending end of the cable moves through the viscous-matter filling portion while pushing the viscous matter aside is high. As a result, an increase in the pressure of the viscous matter in the viscous-matter filling portion is large. Thereby, the degree to which the viscous matter makes direct contact with the outer circumferential surface of the cable is strong. Therefore, in a case where notch grooves are formed in the outer surface of the cable, the notch grooves are filled with the viscous matter completely. Thus, all the space present between the inner surface of the viscous-matter filling portion and the outer surface of the cable is completely filled with the viscous matter. As a result, it is possible to achieve a good waterproof structure.

A cable entrance module according to another aspect of the present invention is provided at a position of equipment at which position a cable enters the equipment from the outside. The cable is inserted through the inside of the cable entrance module. The cable entrance module comprises: a sleeve having a tunnel through which the cable is inserted; a viscous-matter filling portion provided on the exit side of the tunnel and having an entrance-side membrane and an exit-side membrane, the inside of the viscous-matter filling portion being filled with viscous matter; and a pressing mechanism for pressing the sleeve from the outside after the cable is inserted through the sleeve. The entrance-side membrane has a strength such that the entrance-side membrane is pierced by the extending end of the cable when being pushed by the extending end of the cable, the exit-side membrane has a strength such that the exit-side membrane is not pierced by the viscous matter during a step in which the cable pierces the entrance-side membrane, enters the viscous-matter filling portion, and moves through the viscous matter in the viscous-matter filling portion while pushing the viscous matter aside, and the exit-side membrane is pierced by the extending end of the cable when being pushed by the extending end of the cable.

This arrangement has the following advantages:

i) Advantage Obtained From the Portion of the Sleeve at Which the Pressing Mechanism Presses the Sleeve From the Outside The gap between the outer surface of the cable and the pierced entrance-side membrane is narrow. As a result, the length of the viscous matter which is pushed out into the tunnel through the gap when the extending end of the cable goes in the viscous-matter filling portion while pushing the viscous matter aside is long. Further the degree to which the viscous matter clings to the cable is strong. Therefore, when the sleeve is pressed from the outside, even in a case where notch grooves are formed in the outer surface of the cable, the notch grooves are completely filled with the viscous matter. Further, the length of the portion of the cable at which portion the notch grooves are filled with the viscous matter is long. As a result, any gaps formed between the outer surface of the cable and the inner surface of the tunnel are completely filled with the viscous matter. Thus, it is possible to achieve a good waterproof structure.

ii) Advantage Obtained From the Viscous-matter Filling Portion

The gap between the cable and the pierced entrance-side membrane is narrow. As a result, the resistance against the viscous matter being pushed out through said gap when the extending end of the cable moves through the viscous-matter filling portion while pushing the viscous matter aside is high. As a result, an increase in the pressure of the viscous matter in the viscous-matter filling portion is large. Thereby, the degree to which the viscous matter makes direct contact with the outer circumferential surface of the cable is strong. Therefore, in a case where notch grooves are formed in the outer surface of the cable, the notch grooves are filled with the viscous matter completely. As a result, all the space present between the outer surface of the cable and the inner surface of the viscous-matter filling portion is completely filled with the viscous matter. Thus, it is possible to achieve a good waterproof structure.

A cable entrance module according to another aspect of the present invention is provided at a position of equipment at which position a cable enters the equipment from the outside. The cable is inserted through the inside of the cable entrance module. The cable entrance module comprises: a sleeve having a tunnel through which the cable is inserted; a viscous-matter filling portion provided on the exit side of the tunnel and having an exit-side membrane, the inside of the viscous-matter filling portion being filled with viscous matter; and a pressing mechanism for pressing the sleeve from the outside after the cable is inserted through the sleeve. The exit-side membrane has a strength such that the exit-side membrane is not pierced by the viscous matter during a step in which the cable enters the viscous-matter filling portion, and moves through the viscous-matter filling portion while pushing the viscous matter aside, and the exit-side membrane is pierced by the extending end of the cable when being pushed by the extending end of the cable.

This arrangement has the following advantages:

i) Advantage Obtained From the Portion of the Sleeve at Which the Pressing Mechanism Presses the Sleeve From the Outside The exit-side membrane is not pierced by the viscous matter in the step in which the cable enters the viscous-matter filling portion, and moves through the viscous-matter filling portion while pushing the viscous matter aside. Therefore, the viscous matter is pushed out into the tunnel when the cable moves through the viscous-matter filling portion while pushing the viscous matter aside. As a result, when the sleeve is pressed from the outside, even in a case where notch grooves are formed in the outer surface of the cable, the notch grooves are completely filled with the viscous matter. As a result, any gaps formed between the outer surface of the cable and the inner surface of the tunnel are completely filled with the viscous matter. Thus, it is possible to achieve a good waterproof structure.

ii) Advantage Obtained From the Viscous-matter Filling Portion

The exit-side membrane is not pierced by the viscous matter in the step in which the cable enters the viscous-matter filling portion, and moves through the viscous-matter filling portion while pushing the viscous matter aside. Therefore, the viscous matter is prevented from being pushed out from the viscous-matter filling portion in the direction in which the cable goes, when the cable moves through the viscous-matter filling portion. As a result, the cable moves through the viscous-matter filling portion while pushing the viscous matter aside. Thereby, the viscous matter makes direct contact with the outer circumferential surface of the cable. As a result, all the space present between the outer surface of the cable and the inner surface of the viscous-matter filling portion is completely filled with the viscous matter. Thus, it is possible to achieve a good waterproof structure.

Other objects and further features of the present invention will become more apparent from the following detailed description when read in conjunction with the accompanying drawings.

DETAILED DESCRIPTION OF THE PREFERRED EMBODIMENTS

FIGS. 4A, 4B, 4C and 4D show a drop-cable entrance module 100 in an embodiment of the present invention. FIG. 5 shows an exploded view of the drop-cable entrance module 100.

Figure 4A:
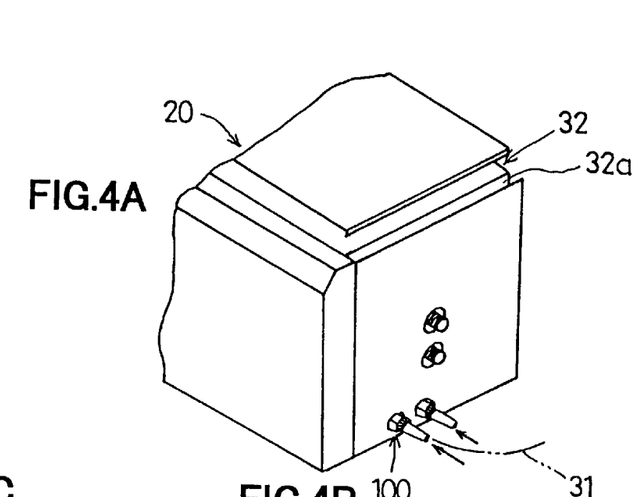
FIGS. 4A, 4B, 4C and 4D show a drop-cable entrance module in one embodiment of the present invention together with a condition in which the drop-cable entrance module is applied to the optical subscriber-line network unit.
Figure 5:
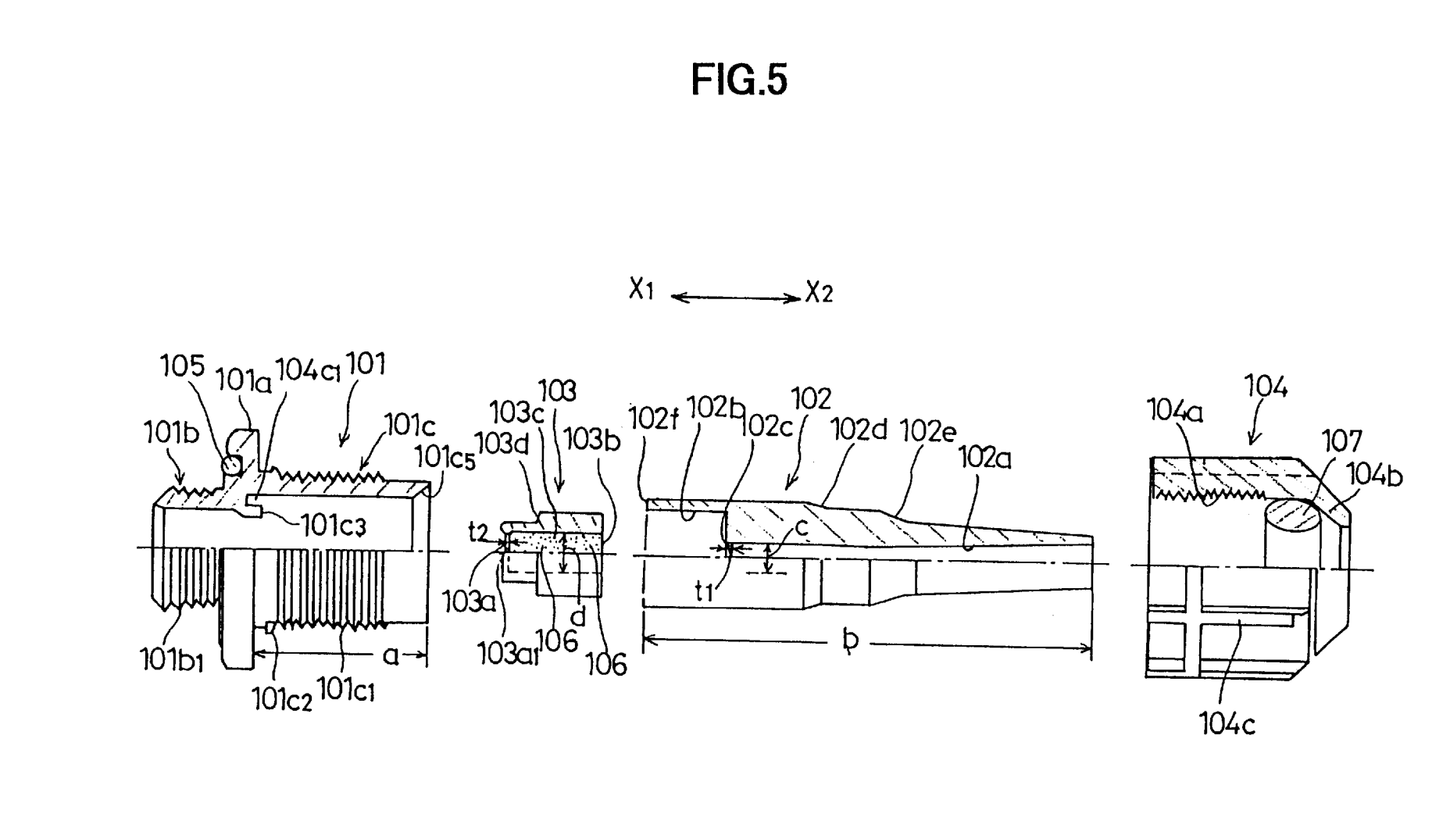
FIG. 5 shows an exploded view of the drop-cable entrance module shown in FIG. 4B.
Figure 6:
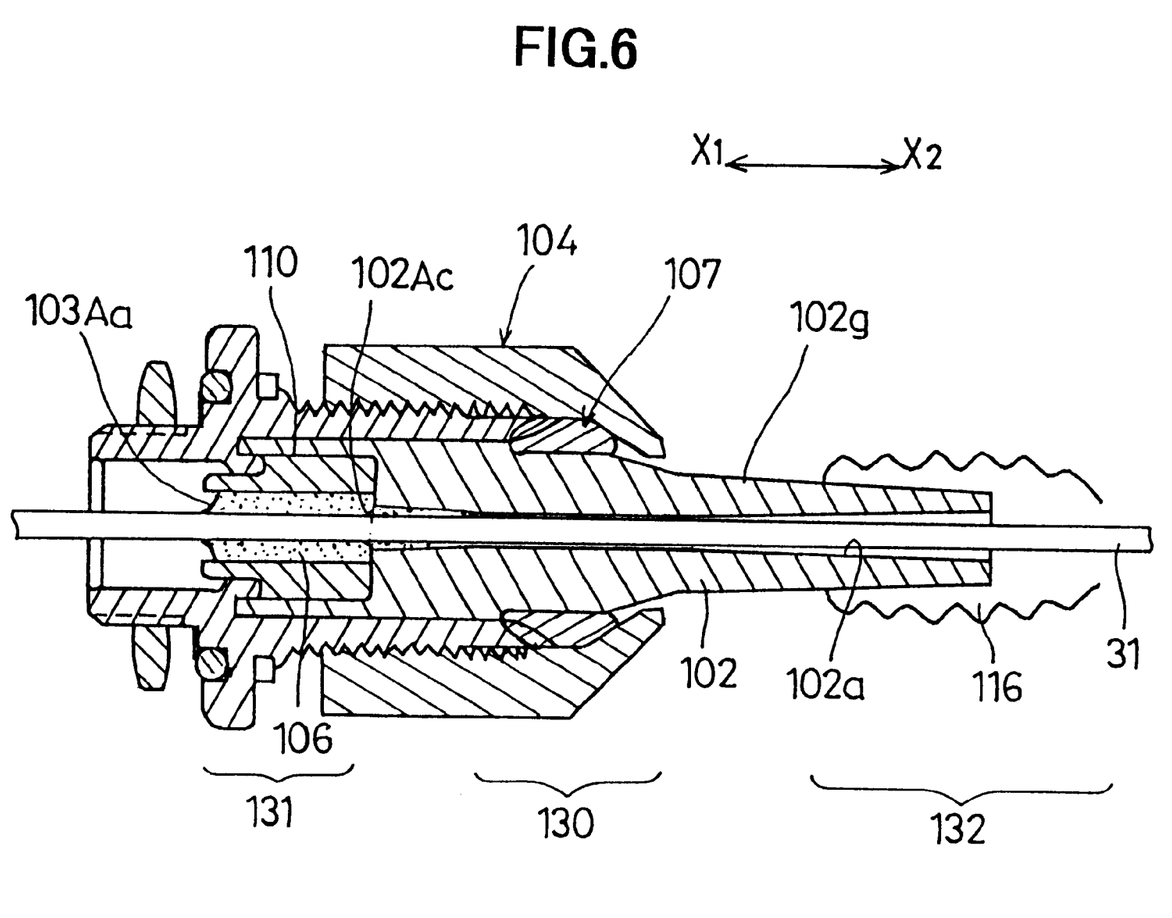
FIG. 6 shows a condition in which a drop cable has been inserted through the drop-cable entrance module shown in FIG. 4B.

FIG. 4A shows a condition in which the drop-cable entrance module 100 is attached to an optical subscriber-line network unit 20. FIG. 6 shows a condition in which the drop cable 31 has been inserted through the drop-cable entrance module 100 and has been fixed in the drop-cable entrance module 100.

Figure 4B:
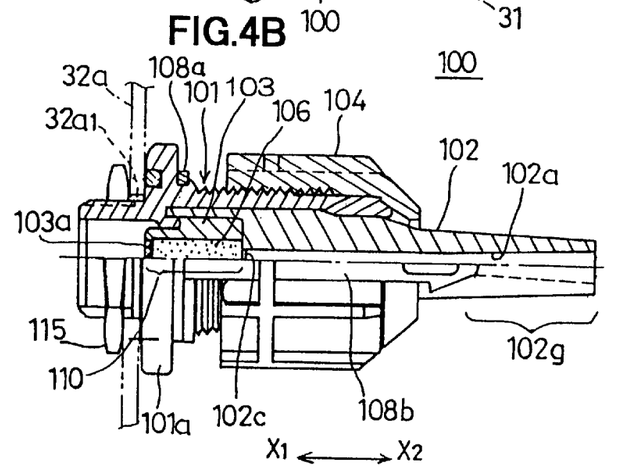
Figure 4C:
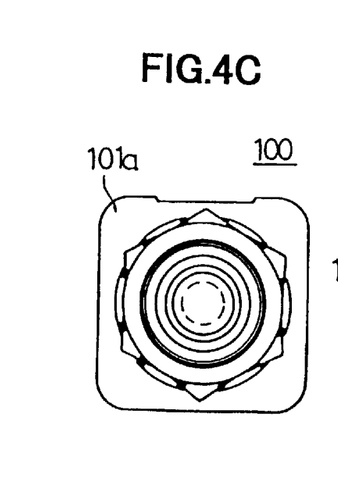
Figure 4D:
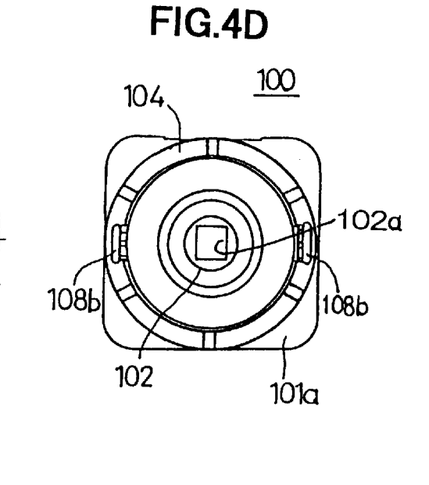

As shown in FIGS. 4B, 4C and 4D, the drop-cable entrance module 100 includes a body 101, a sleeve 102, a grease box 103, and a cap 104.

The parts 101, 102, 103 and 104 of the drop-cable entrance module 100 will now be described.

The body 101 includes a rectangular flange portion 101a, a first pipe portion 101b which projects in the X1 direction from the flange portion 101a, and a second pipe portion 101c which projects in the X2 direction from the flange portion 101a by a dimension 'a', as shown in FIG. 5. An O-ring 105 is provided on the surface of the flange portion 101a on the side of the X1 direction. A thread portion 101b1 is formed on the outer circumferential surface of the first pipe portion 101b. A thread portion 101c1 and a connection-band holding projection 101c2 are formed on the outer circumferential surface of the second pipe portion 101c. On the inner circumferential surface of the second pipe portion 101c, a ring-shaped rib portion 101c3 and a ring-shaped groove portion 101c4 are formed on the side of the X1-direction end, and a taper portion 101c5 is formed at the opening portion on the side of the X2-direction end.

As shown in FIG. 4B, a ring portion 108a of a connection band is held by the connection-band holding projection 101c2 and is attached to the body 101 rotatably with respect to the body 101.

The sleeve 102 is made of rubber, and has a length 'b' approximately twice the length 'a' of the second pipe portion 101c, as shown in FIG. 5. The sleeve 102 has a tunnel 102a inside thereof and the tunnel 102a has a cross section having a square shape as shown in FIG. 4D. The tunnel 102a is sufficiently large such that the drop cable 31 may be inserted into the tunnel 102a. Each side of the square shape has the length 'c'. A grease-box containing portion 102b is provided in the sleeve 102 on the side of the X1-direction end. On the side of the X1-direction end of the tunnel 102a, an entrance-side membrane 102c is provided. The thickness t1 of the membrane 102c is approximately 0.3 through 0.5 mm. The outer diameter of the sleeve 102 is large on the side of the X1-direction end and small on the side of the X2-direction end. The sleeve 102 has taper portions 102d and 102e on the outer circumferential side between both ends thereof. A ring-shaped end portion 102f is provided at the X1-direction end of the sleeve 102.

The grease box 103 is made of rubber and has a pipe shape. A cylindrical grease filling space 103c is formed inside the grease box 103. The X1-direction end of the grease filling space 103c is covered by an exit-side membrane 103a. The grease filling space 103c has an opening 103b at the X2-direction end thereof. The diameter 'd' of the grease filling space 103c is approximately twice the length 'c' of each side of the above-mentioned square, and, thus, is large. The grease filling space 103c is filled with grease 106. The grease 106 acts as viscous matter. The quantity of the grease 106 is 100 through 150 mm$^3$. The thickness t2 of the exit-side membrane 103a is approximately 0.3 through 0.5 mm. The grease box 103 has a step portion 103d on the outer circumferential side thereof A female thread portion 104a is formed on the inner circumferential side of the cap 104. The cap 104 has a taper portion 104b on the side of the X2-direction end on the inner circumferential side thereof. The cap 104 has non-slip ribs 104c formed on the outer circumferential side thereof. A pressing ring 107 is incorporated inside of the taper portion 104b. The cap 104 is connected with extending portions 108b of the connection band in consideration of high lift work so that the cap 104 is prevented from falling when the cap 104 is detached from the body 101.

The viscosity coefficient of the grease 106 obtained from a shear flow test using rubber is 2.0 through 3.5 centipoise (cP). Further, the grease 106 has water repellency, and has a property such that the grease 106 does not harden when touching air. If the viscosity coefficient of the grease is lower than 2.0 through 3.5 cP, the grease flows by gravity. Therefore, this viscosity coefficient is not preferable. If the viscosity coefficient of the grease is higher than 2.0 through 3.5 cP, pushing out of the grease in the X2 direction, as will be described later, cannot be performed easily. Therefore, this viscosity coefficient is not preferable.

It is possible that, instead of grease 106, a jelly-like matter, a gel-like matter, or a sol-like matter can be used.

The drop-cable entrance module 100 is assembled, as shown in FIG. 4B, as follows: the grease box 103 filled with the grease 106 is fitted into and contained in the grease-box containing portion 102b of the sleeve 102 from the side of the opening 103b of the grease box 103; the sleeve 102 is inserted into the second pipe portion 101c of the body 101 deeply; and the cap 104 is lightly screwed onto the thread portion 101c1 of the second pipe portion 101c of the body 101.

The thus-assembled drop-cable entrance module 100 will now be described.

The drop-cable entrance module 100 has a grease filling portion 110 at a deep position of the tunnel 102a, which tunnel guides the drop cable 31 which is inserted into the drop-cable entrance module 100 in the X1 direction. The grease filling portion 110 is formed as a result of the grease box 103 and the sleeve 102 being combined. The inside of the grease filling portion 110 is completely filled with the grease 106. The entrance-side membrane 102c is provided on the side of the X2-direction end of the grease filling portion 110, and the exit-side membrane 103a is provided on the side of the X1-direction end of the grease filling portion 110. The entrance-side membrane 102c having the thickness t1 of approximately 0.3 mm has a strength such that the entrance-side membrane 102c is pierced by the extending end of the drop cable 31 when the extending end of the drop cable 31 which is inserted in the X1 direction pushes the entrance-side membrane 102c. The exit-side membrane 103a having the thickness t2 of approximately 0.3 mm has a strength such that the exit-side membrane 103a is not pierced by the grease 106 in a step in which the extending end of the drop cable 31 pierces the entrance-side membrane 102c, as will be described later, and goes into the space filled with the grease 106. In this step, the pressure is applied to the exit-side membrane 103a uniformly. However, the strength of the exit-side membrane 103a is such that the exit-side membrane 103a is pierced by the extending end of the cable when the extending end of the drop cable 31 touches the exit-side membrane 103a at a pinpoint and pushes the exit-side membrane 103a.

The sleeve 102 has a portion 102g (shown in FIG. 6) which projects in the X2 direction from the cap 104, and a self-welding tape or soft rubber tape is wound on this portion 102g. In this arrangement, it is possible to wind the self-welding tape or soft rubber tape after the drop cable 31 is inserted into the drop-cable entrance module 100. As a result of winding the self-welding tape or soft rubber tape, it is possible to achieve a good waterproof structure.

Features of the drop-cable entrance module 100 with regard to assembling thereof will now be described.

The final position to which the sleeve 102 is pushed into the second pipe portion 101c of the body 101 is determined by the position at which the step portion 103d of the grease box 103 touches the ring-shaped rib portion 101c3. Therefore, it is not necessary to pay attention to the final portion to which the sleeve 102 is pushed into the body 101. Only strongly pushing the sleeve 102 into the body 101 is necessary. Thus, the work can be easily performed. Further, when the sleeve 102 is strongly pushed into the body 101, the side of the opening 103b of the grease box 103 is strongly pushed into the deepest portion of the grease-box containing portion 102b of the sleeve 102. As a result, the opening 103b of the grease box 103 is completely covered.

Further, as mentioned above, the grease filling portion 110 is formed as a result of the grease box 103 and the sleeve 102 being combined. As a result, in comparison to a case where such a grease filling portion is formed inside of the sleeve 102 itself, the manufacturing can be easily performed, filling of the grease filling portion 110 with the grease 106 can be easily performed, and assembling can be easily performed. Further, an air escaping hole 103a1 is formed at the center of the exit-side membrane 103a of the grease box 103 (see FIG. 7B). Therefore, when the grease filling space 103c of the grease box 103 is filled with the grease 106 from the side of the opening 103b, air in the vicinity of the deepest portion of the grease filling space 103c escapes through the air escaping hole 103a1. As a result, a problematic situation in which air does not completely escape from and remains in the grease filling space 103c can be prevented. Thereby, it is possible to positively and completely fill the grease filling space 103c with the grease 106. The diameter of the air escaping hole 103a1 is approximately 1 mm, and, thus, is very small. Further, the viscosity of the grease is high. Therefore, the grease is hardly pushed out through the air escaping hole 103a1 during a step in which the extending end of the drop cable pierces the entrance-side membrane 102c and goes through the space which is filled with the grease.

As shown in FIGS. 4A and 4B, the above-described drop-cable entrance module 100 is attached to the optical subscriber-line network unit 20 in the following condition: the first pipe portion 101b is fitted into an opening 32a1 of the side plate 32a of the box 32 of the optical subscriber-line network unit 20; a nut 115 is screwed onto the thread portion 101b1 of the first pipe portion 101b, the nut 115 is tightened, and, thereby, the side plate 32a is sandwiched by the nut 115 and the flange portion 101a of the body 101; and sealing is performed by the O-ring 105. A plug (not shown in the figure) is inserted into the end of the sleeve 102 which extends externally, and, thereby, the end of the sleeve 102 is temporarily plugged until the drop cable 31 is inserted into the sleeve 102.

An operation performed when the drop cable is inserted into the drop-cable entrance module 100 of the optical subscriber-line network unit 20 which has been set, and an operation performed when the drop cable which has been thus inserted into the drop-cable entrance module 100 is fixed to the drop-cable entrance module 100 will now be described.

When the drop cable 31 is inserted through the inside of the drop-cable entrance module 100 and fixed there, the drop cable 31 and the drop-cable entrance module 100 enter a condition shown in FIG. 6.

Figure 9A:
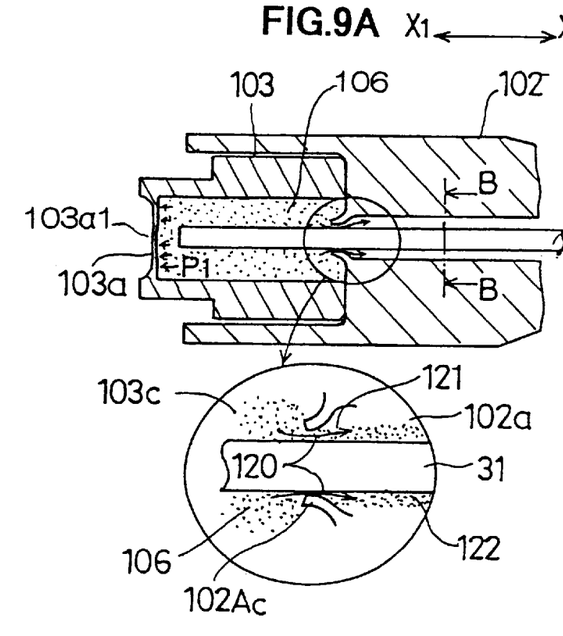
FIGS. 9A and 9B show a condition of a third step of the entrance of the drop cable.
Figure 9B:
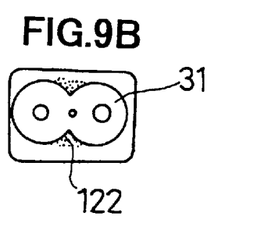
Figure 10A:
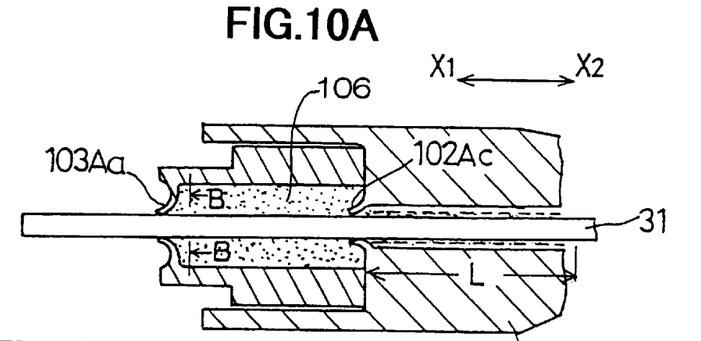
FIGS. 10A and 10B show a condition of a fourth step of the entrance of the drop cable.
Figure 10B:
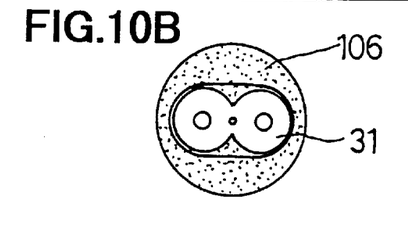
Figure 11A:
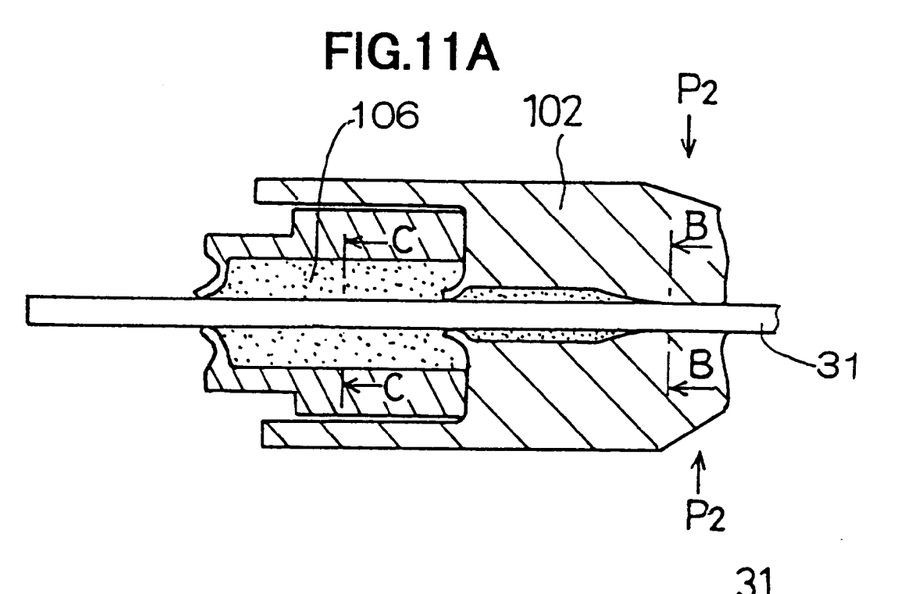
FIGS. 11A, 11B and 11C show a condition in which the outer circumferential surface of the sleeve is pressed inwards.
Figure 11B:
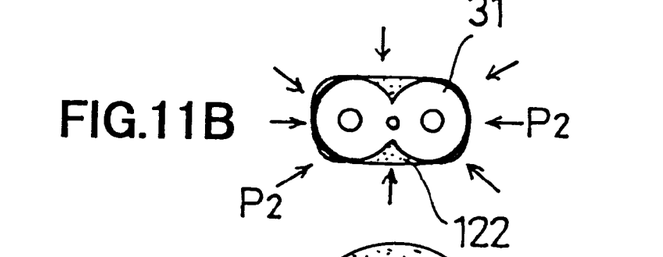
Figure 11C:
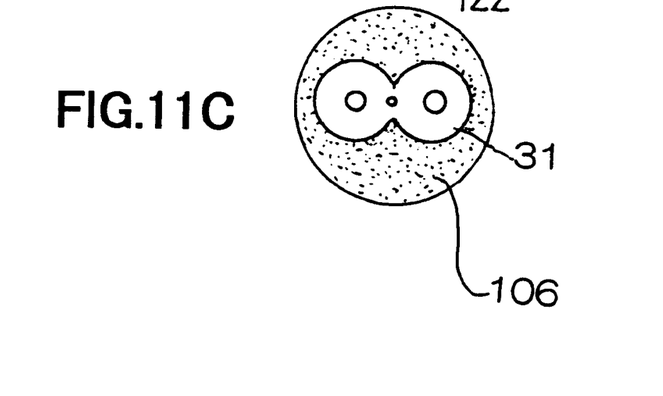

FIGS. 7A, 7B, 7C, 7D, 8A, 8B, 9A, 9B, 10A and 10B show change in condition performed when the drop cable 31 is inserted into the drop-cable entrance module 100. FIGS. 11A, 11B and 11C show a condition in which the drop cable has been fixed after being inserted through the drop-cable entrance module 100.

Figure 7A:
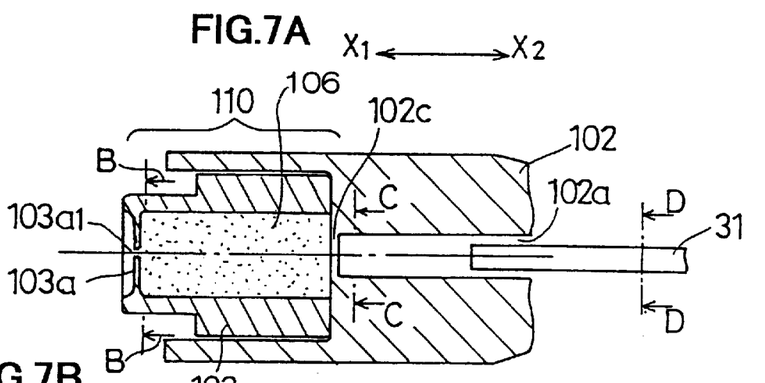
FIGS. 7A, 7B, 7C and 7D show a condition of a first step of entrance of the drop cable.
Figure 7B:
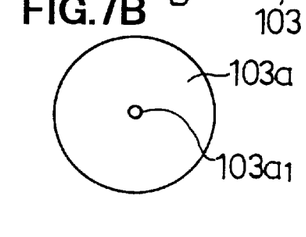
Figures 7C, 7D:
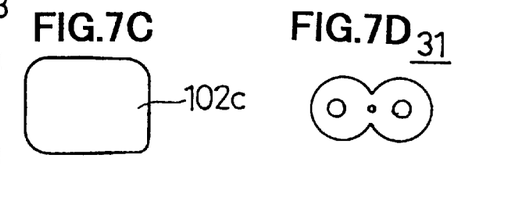

First, as shown in FIG. 7A, the drop cable 31 is inserted into the tunnel 102a of the sleeve 102 in the X1 direction while being guided by the tunnel 102a. At this time, it is not necessary to align the drop cable 31 with the center of the tunnel 102a. Thus, the work is not troublesome.

Figure 8A:
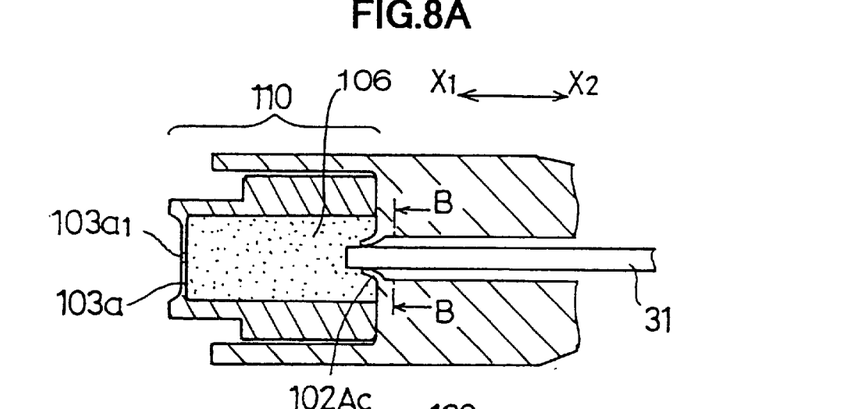
FIGS. 8A and 8B show a condition of a second step of the entrance of the drop cable.
Figure 8B:
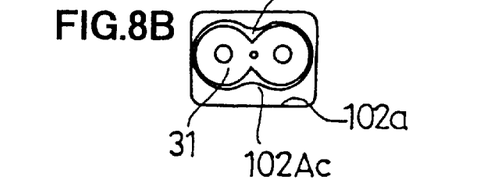

As shown in FIGS. 8A and 8B, the extending end of the drop cable 31 pierces the entrance-side membrane 102c and enters the grease filling portion 110.

The reference numeral 102Ac is given to the entrance-side membrane which is pierced by the extending end of the drop cable 31. The portion at which the entrance-side membrane 102c is damaged is limited to the portion at which the drop cable 31 pierces the entrance-side membrane 102c. Further, due to the elastic force of the pierced entrance-side membrane 102Ac itself, the hole formed as a result of the entrance-side membrane 102c being pierced by the extending end of the drop cable 31 becomes narrow, and the pierced entrance-side membrane 102Ac is pressed against the outer surface of the drop cable 31. Therefore, gaps 120 between the pierced entrance-side membrane 102Ac and the outer surface of the drop cable 31 are narrow. The gaps 120 are mainly formed at portions which face the notch grooves 44 and 45, respectively.

Then, as shown in FIG. 9A, the extending end of the drop cable 31 moves in the X1 direction in the grease filling portion 110 while pushing the grease 106 aside.

When the extending end of the drop cable 31 moves in the X1 direction in the grease filling portion 110 while pushing the grease 106 aside, a-pressure P1 in the X1 direction is applied to the exit-side membrane 103a. However, the pressure P1 is applied to the exit-side membrane 103a uniformly on the entire surface thereof. Therefore, in the step in which the extending end of the drop cable 31 moves in the X1 direction in the grease filling portion 110 while pushing the grease 106 aside, the exit-side membrane 103a is not pierced by the grease 106. The volume of the grease 106 which has been pushed aside by the extending end of the drop cable 31 is pushed out into the tunnel 102a through the gaps 120 in the X2 direction, as indicated by the arrows 121.

Because the gaps 120 are narrow, the grease 106 is pushed out a long distance L (shown in FIG. 10A) while clinging to the outer surface of the drop cable 31. The reference numeral 122 is given to the grease which has been pushed out into the tunnel 102a while clinging to the outer surface of the drop cable 31.

Then, the extending end of the drop cable 31 which is inserted into the grease filling potion 110 touches the exit-side membrane 103a at a pinpoint thereof, and pushes the exit-side membrane 103a. Thereby, the exit-side membrane 103a is pierced by the extending end of the drop cable 31, as shown in FIGS. 10A and 10B. The reference numeral 103Aa is given to the exit-side membrane which was thus pierced by the extending end of the drop cable 31. Thus, the extending end of the drop cable 31 enters the optical subscriber-line network unit 20.

In a condition in which a predetermined length of the extending-end side of the drop cable 31 has entered the optical subscriber-line network unit 20, the grease 122 pushed out into the tunnel 102a clings to the outer surface of the drop cable 31 and extends by the long distance L in the X2 direction. In the grease filling portion 110, the grease 106 makes direct contact with the outer circumferential surface of the drop cable 31.

Thus, the drop cable 31 is inserted through the drop-cable entrance module 100.

Then, the cap 104 is tightened strongly with a hand directly. Because the non-slip ribs 104c are formed on the cap 104, it is possible to strongly tighten the cap 104 with a hand directly without using any tool. As a result of the cap 104 being tightened, as shown in FIG. 6, the pressing ring 107 is sandwiched by the taper portion 104b of the cap 104 and the taper portion 101c5 of the second pipe portion 101c of the body 101 so that the diameter of the pressing ring 107 is reduced, and the pressing ring 107 presses the sleeve 102 over the entire circumference thereof with a pressure P2 (shown in FIGS. 11A and 11B). As a result, as shown in FIGS. 11A and 11B, the tunnel 102a of the sleeve 102 narrows, and presses the drop cable 31. Thereby, the sleeve 102 fixes the drop cable 31. Further, the pressing ring 107 presses the taper portion 102d of the sleeve 102. Thereby, the sleeve 102 is fixed to the body 101 so that the sleeve 102 is prevented from slipping off in the X2 direction.

Finally, as shown in FIG. 6, the self-welding tape or soft rubber tape 116 is wound onto the above-mentioned portion 102g of the sleeve 102 and the portion of the drop cable 31 continuously.

The waterproof structure which prevents rain water drops flowing on the drop cable 31 from entering the optical subscriber-line network unit 20 will now be described.

As shown in FIG. 6, the waterproof structure includes three waterproof structure portions 131, 130 and 132 which are arranged in series side by side along the drop cable 31. One of them is the main waterproof structure portion 130. The other ones are the waterproof structure portions 131 and 132 which back up the main waterproof structure portion 130.

As shown in FIGS. 11A and 11B, the main waterproof structure portion 130 is a structure in which, for the portion of the outer surface of the drop cable 31 to which portion the grease clings, as a result of the sleeve 102 being pressed over the entire circumference thereof with the pressure P2 as mentioned above, the inner surface of the tunnel 102a of the sleeve 102 approximately makes contiguous contact with the outer circumferential surface of the drop cable 31, and the gaps remaining because the inner surface of the tunnel 102a of the sleeve 102 does not completely makes contiguous contact with the outer circumferential surface of the drop cable 31, for example, at deepest portions of the notch grooves 44 and 45, are filled with the grease completely. Thus, in the waterproof structure portion 130, any gaps formed between the inner surface of the tunnel 102a of the sleeve 102 and the outer circumferential surface of the drop cable 31 are completely filled with the grease 106. As a result, no water can pass through the waterproof structure portion 130.

Rain water drops flowing on the drop cable 31 are prevented from further entering as a result of being stopped by the waterproof structure portion 130. Water which flows through the deepest portions of the notch grooves 44 and 45 in capillary action is also prevented from further entering as a result of being stopped by the waterproof structure portion 130.

The first back-up waterproof structure portion 131 is a portion located inside the grease filling portion 110. In the waterproof structure portion 131 in the grease filling portion 110, the grease 106 makes direct contact to the outer circumferential surface of the drop cable 31, and the notch grooves 44 and 45 are filled with the grease 106. Thus, in the waterproof structure portion 131, all the space present between the inner surface of the grease filling portion 110 and the outer circumferential surface of the drop cable 31 is completely filled with the grease 106. As a result, no water can pass through the waterproof structure portion 131. Therefore, even if rain water drops pass through the waterproof structure portion 130, or even if rain water drops enters between the waterproof structure portion 130 and the waterproof structure portion 131, the rain water drops are prevented from further entering as a result of being stopped by the waterproof structure portion 131. Water which flows through the deepest portions of the notch grooves 44 and 45 in capillary action is also prevented from further entering as a result of being stopped by the waterproof structure portion 131.

The second back-up waterproof structure 132 is the wound self-welding tape or soft rubber tape 116. This second back-up waterproof structure portion 132 first stops rain water drops which flow on the drop cable 31.

With the waterproof structure portion 130 alone, the waterproof function is sufficiently performed. However, by providing the first and second back-up waterproof structure portions 131 and 132, the waterproof function is more sufficiently performed.

The present inventors performed a test on the drop-cable entrance module 100 having the drop cable 31 inserted therethrough for 500 hours in temperature cycles of −65° C. through 125° C. Then, the drop-cable entrance module 100 having the drop cable 31 inserted therethrough was submerged. As a result, no water which had entered the drop-cable entrance module 100 having the drop cable 31 inserted therethrough was found. Further, ultraviolet rays were applied to the drop-cable entrance module 100 having the drop cable 31 inserted therethrough for 4,000 hours. Then, the drop-cable entrance module 100 having the drop cable 31 inserted therethrough was submerged. As a result, no water which had entered the drop-cable entrance module 100 having the drop cable 31 inserted therethrough was found. Furthermore, a natural environment exposure test was performed on the drop-cable entrance module 100 having the drop cable 31 inserted therethrough from the rainy season to the summer season in Okinawa. Then, the drop-cable entrance module 100 having the drop cable 31 inserted therethrough was submerged. As a result, no water which had entered the drop-cable entrance module 100 having the drop cable 31 inserted therethrough was found.

The waterproof structure portions 130 and 131 have the following features:

i) In the waterproof structure portion 130, the grease 106 is provided over the long distance L, as shown in FIG. 10A. Thereby, the waterproof effect is high.

If the entrance-side membrane 102c is not provided, because the gap between the outer surface of the drop cable 31 and the inner surface of the tunnel 102a is wide, the length of the grease which is pushed out in the X2 direction into the tunnel 102a when the extending end of the drop cable 31 moves in the X1 direction in the grease filling portion 110 while pushing the grease 106 aside is relatively short. Further the degree to which the grease 106 clings to the drop cable 31 is relatively weak. As a result, the waterproof effect of the waterproof structure portion is relatively low. In contrast to this, when the entrance-side membrane 102c is provided, because the gaps between the outer surface of the drop cable 31 and the pierced entrance-side membrane 102Ac are narrow, the length of the grease which is pushed out in the X2 direction into the tunnel 102a when the extending end of the drop cable 31 moves in the X1 direction in the grease filling portion 110 while pushing the grease 106 aside is relatively long. Further the degree to which the grease 106 clings to the drop cable 31 is relatively strong. As a result, the waterproof effect of the waterproof structure portion 130 is relatively high. Thus, the provision of the entrance-side membrane 102c is important.

ii) In the waterproof structure portion 131, the grease 106 in the grease filling portion 110 makes direct contact to the outer circumferential surface of the drop cable 31 strongly. As a result, the waterproof effect is high.

If the entrance-side membrane 102c is not provided, because the gap between the outer surface of the drop cable 31 and the inner surface of the tunnel 102a is wide, the resistance against the grease 106 being pushed out into the tunnel 102a in the X2-direction through the gap when the extending end of the drop cable 31 moves in the X1 direction in the grease filling portion 110 while pushing the grease 106 aside is relatively low. As a result, an increase in the pressure of the grease 106 in the grease filling portion 110 is relatively small. In contrast to this, when the entrance-side membrane 102c is provided, because the gaps between the outer surface of the drop cable 31 and the pierced entrance-side membrane 102Ac are narrow, the resistance against the grease 106 being pushed out into the tunnel 102a in the X2-direction through the gaps when the extending end of the drop cable 31 moves in the X1 direction in the grease filling portion 110 while pushing the grease 106 aside is relatively high. As a result, an increase in the pressure of the grease 106 in the grease filling portion 110 is relatively large. Thereby, the degree to which the grease 106 makes direct contact with the outer circumferential surface of the drop cable 31 is relatively strong. Thus, the provision of the entrance-side membrane 102c is important.

iii) The grease 106 is not hydrophilic but is water repellent. Therefore, when water touches the grease 106, the grease 106 does not melt. Conversely, the grease 106 repels water. Therefore, the waterproof structure portions 130 and 131 have a high waterproof effect.

iv) The viscosity coefficient of the grease 106 obtained from the shear flow test using rubber is 2.0 through 3.5 cP. Therefore, the grease 106 does not flow due to gravity. As a result, the waterproof effect is maintained for a long term.

v) The grease 106 has the property such that the grease 106 does not harden when touching air. Therefore, it is possible to pull out the drop cable 31 after the cap 104 is loosened. Therefore, maintenance of the drop-cable entrance module 100 can be easily performed.

Variant embodiments of the drop-cable entrance module 100 will now be described.

Figure 12:
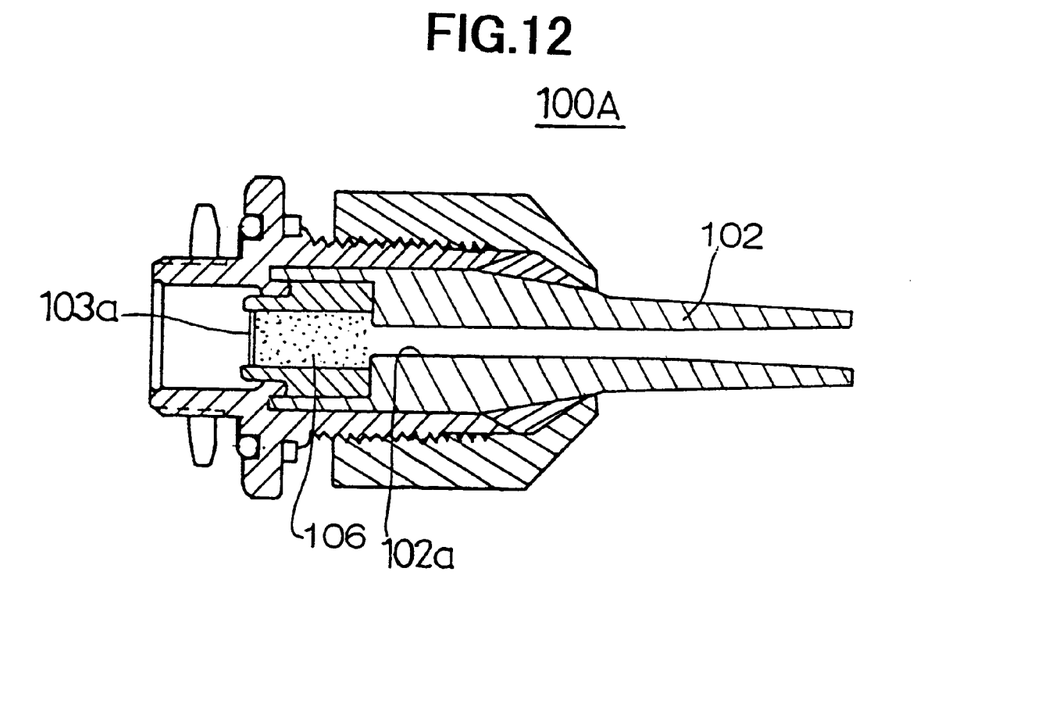
FIG. 12 shows a first variant embodiment according to the present invention.

FIG. 12 shows a drop-cable entrance module 100A in a first variant embodiment. This drop-cable entrance module 100A includes the exit-side membrane 103a but does not include the entrance-side membrane. When the extending end of the drop cable 31 moves in the X1 direction in the grease filling portion 110 while pushing the grease 106 aside, the grease 106 is pushed out into the tunnel 102a in the X2 direction.

Figure 13:
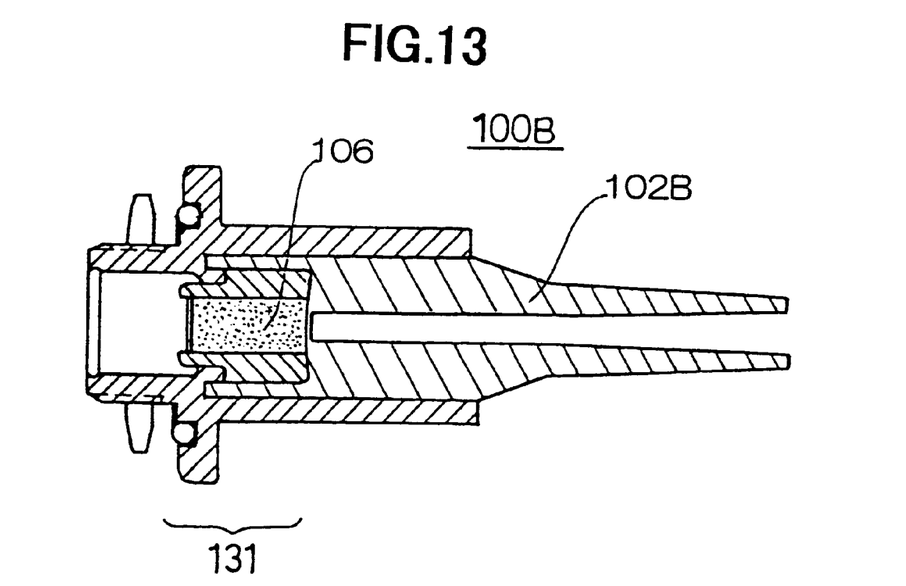
FIG. 13 shows a second variant embodiment according to the present invention.

FIG. 13 shows a drop-cable entrance module 100B in a second variant embodiment. This drop-cable entrance module 100B includes only the above-described waterproof structure portion 131, that is, does not include the waterproof structure portion 130. In this case, no cap which presses the outer circumferential surface of a sleeve 102B is provided. Therefore, pressing the outer circumferential surface of the sleeve 102B is not performed.

Figure 14:
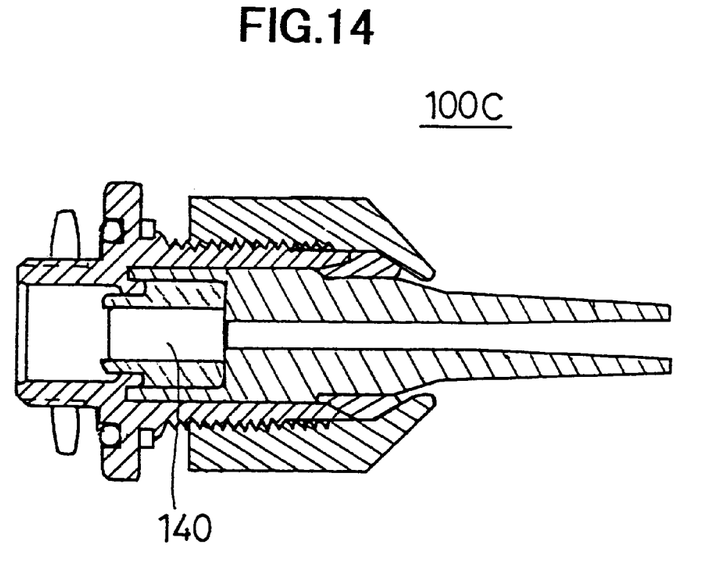
FIG. 14 shows a third variant embodiment according to the present invention.

FIG. 14 shows a drop-cable entrance module 100C in a third variant embodiment. In the drop-cable entrance module 100C, the grease filling portion is empty. The reference numeral 140 is given to a space which will be filled with grease, but is empty. When the drop-cable entrance module 100C is used, the space 140 is filled with grease at a construction site. Thus, it is possible to achieve a drop-cable entrance module in a form in which installation of the drop-cable entrance module is performed in a manner in which the grease filling portion is filled with the grease at a construction site.

Figure 15:
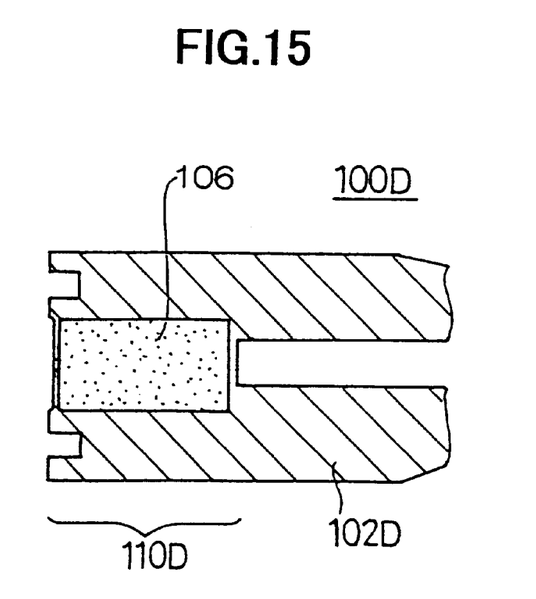
FIG. 15 shows a fourth variant embodiment according to the present invention.

FIG. 15 shows a drop-cable entrance module 100D in a fourth variant embodiment. This drop-cable entrance module 100D does not include a grease box, but a sleeve 102D itself has a grease filling portion 110D at the end of the sleeve 102D.

In each of the above-described embodiment and variant embodiments, it is sufficient that the material of the sleeve 102, 102B or 102D and the grease box 103 has flexibility, and the sleeve 102, 102B or 102D and the grease box 103 may be made of a gum synthetic resin.

Figure 2B:
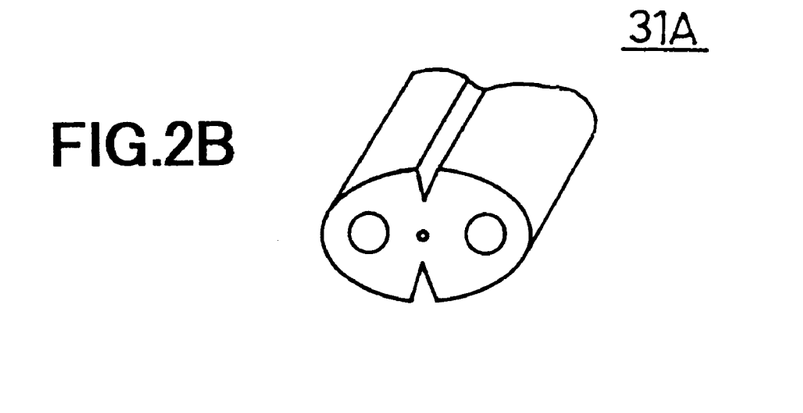
Figure 2C:
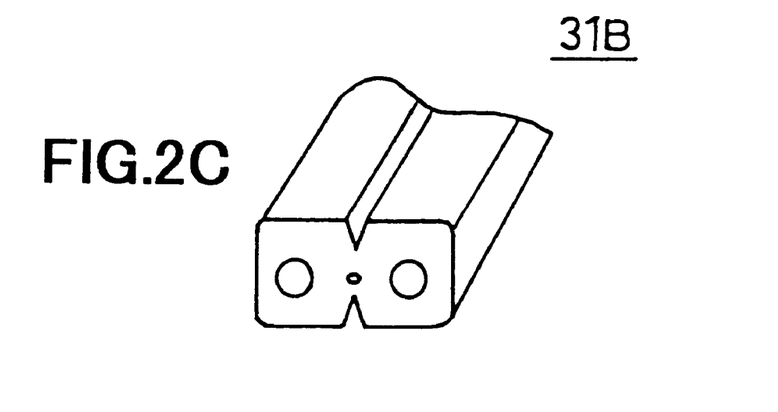

To each of the drop-cable entrance module 100 and the variant embodiments thereof, any of a drop cable 31A shown in FIG. 2B and a drop cable 31B shown in FIG. 2C can be applied. The shape of the cross section of the drop cable 31A is generally oval, and notch grooves are formed on the top and bottom ends of the drop cable 31A, respectively. The shape of the cross section of the drop cable 31B is generally rectangle, and notch grooves are formed on the top and bottom surfaces of the drop cable 31B, respectively. In a case where any of the drop cables 31B and 31C is applied to each of the drop-cable entrance module 100 and the variant embodiments thereof, the waterproof function is performed similarly to the case where the drop cable 31 is applied to each of the drop-cable entrance module 100 and the variant embodiments thereof. Further, the present invention can be applied not only to such a drop cable having a special cross section but also to a general cable having a circular cross section. Further, each of the drop-cable entrance module 100 and the variant embodiments thereof can be applied not only to the aerially installed optical subscriber-line network unit 20 but also to other equipment.

Further, the present invention is not limited to the above-described embodiments, and variations and modifications may be made without departing from the scope of the present invention.

The contents of the basic Japanese patent application No. 10-162497, filed on Jun. 10, 1998, are hereby incorporated by reference.

What is claimed is:

1. A cable entrance module which is provided at a position of equipment at which position a cable enters said equipment from the outside, said cable being inserted through the inside of said cable entrance module, said cable entrance module comprising an entrance-side membrane, an exit-side membrane, and a viscous-matter filling portion, the inside of which portion is filled with viscous matter, wherein said entrance-side membrane has a strength such that said entrance-side membrane is pierced by an extending end of said cable when being pushed by said extending end of said cable, said exit-side membrane has a strength such that said exit-side membrane is not pierced by said viscous matter during a step in which said cable pierces said entrance-side membrane, enters said viscous-matter filling portion, and moves through said viscous-matter filling portion while pushing said viscous matter aside, and said exit-side membrane is pierced by said extending end of said cable when being pushed by said extending end of said cable.

2. A cable entrance module which is provided at a position of equipment at which position a cable enters said equipment from the outside, said cable being inserted through the inside of said cable entrance module, said cable entrance module comprising:

a sleeve having a tunnel through which said cable is inserted;

a viscous-matter filling portion provided on the exit side of said tunnel and having an entrance-side membrane and an exit-side membrane, the inside of said viscous-matter filling portion being filled with viscous matter; and a pressing mechanism for pressing said sleeve from the outside after said cable is inserted through said sleeve, wherein said entrance-side membrane has a strength such that said entrance-side membrane is pierced by an extending end of said cable when being pushed by said extending end of said cable, said exit-side membrane has a strength such that said exit-side membrane is not pierced by said viscous matter during a step in which said cable pierces said entrance-side membrane, enters said viscous-matter filling portion, and moves through said viscous-matter filling portion while pushing said viscous matter aside, and said exit-side membrane is pierced by said extending end of said cable when being pushed by said extending end of said cable.

3. The cable entrance module as claimed in claim 2, wherein:

said viscous-matter filling portion is formed as a result of said sleeve and a viscous-matter box being combined;

said sleeve has a viscous-matter-box containing portion, at an end thereof, in which portion said viscous-matter box is fitted and contained, said sleeve further having said entrance-side membrane on the exit side, as an exit to said viscous-matter-box containing portion, of said tunnel;

said viscous-matter box has a cylindrical space having an opening at one end thereof and said exit-side membrane at the other end thereof, said space being filled with said viscous matter, said viscous-matter box being fitted into said viscous-matter-box containing portion in a manner in which the side of said opening of said cylindrical space faces said entrance-side membrane of said sleeve.

4. The cable entrance module as claimed in claim 3, wherein said viscous-matter box has an air escaping hole in said exit-side membrane.

5. A cable entrance module which is provided at a position of equipment at which position a cable enters said equipment from the outside, said cable being inserted through the inside of said cable entrance module, said cable entrance module comprising:

a sleeve having a tunnel through which said cable is inserted;

a viscous-matter filling portion provided on the exit side of said tunnel and having an exit-side membrane, the inside of said viscous-matter filling portion being filled with viscous matter; and a pressing mechanism for pressing said sleeve from the outside after said cable is inserted through said sleeve, wherein said exit-side membrane has a strength such that said exit-side membrane is not pierced by said viscous matter during a step in which said cable enters said viscous-matter filling portion, and moves through said viscous-matter filling portion while pushing said viscous matter aside, and said exit-side membrane is pierced by an extending end of said cable when being pushed by said extending end of said cable.

6. The cable entrance module as claimed in claim 1, wherein said viscous matter has a viscosity such that said viscous matter does not drop due to gravity, is water repellent, and does not harden when touching air.

7. The cable entrance module as claimed in claim 2, wherein said viscous matter has a viscosity such that said viscous matter does not drop due to gravity, is water repellent, and does not harden when touching air.

8. The cable entrance module as claimed in claim 5, wherein said viscous matter has a viscosity such that said viscous matter does not drop due to gravity, is water repellent, and does not harden when touching air.

9. The cable entrance module as claimed in claim 2, wherein said sleeve projects externally from said pressing mechanism, and has a portion onto which one of a self-welding tape and a soft rubber tape is wound.

10. The cable entrance module as claimed in claim 5, wherein said sleeve projects externally from said pressing mechanism, and has a portion onto which one of a self-welding tape and a soft rubber tape is wound.

11. The cable entrance module as claimed in claim 2, wherein said viscous-matter filling portion is empty.

12. The cable entrance module as claimed in claim 5, wherein said viscous-matter filling portion is empty.

13. The cable entrance module as claimed in claim 1, wherein said viscous matter has a viscosity such that the viscosity coefficient of said viscous matter obtained from a shear flow test using rubber is 2.0 through 3.5 centipoise.

14. The cable entrance module as claimed in claim 2, wherein said viscous matter has a viscosity such that the viscosity coefficient of said viscous matter obtained from a shear flow test using rubber is 2.0 through 3.5 cP.

15. The cable entrance module as claimed in claim 5, wherein said viscous matter has a viscosity such that the viscosity coefficient of said viscous matter obtained from a shear flow test using rubber is 2.0 through 3.5 cP.

* * * * *